United States Patent [19]

Ravis

[11] 4,257,089
[45] Mar. 17, 1981

[54] REGULATED VARIABLE FREQUENCY DC/DC CONVERTER

[75] Inventor: James C. Ravis, Excelsior, Minn.

[73] Assignee: The United States of America as represented by the Secretary of the Army, Washington, D.C.

[21] Appl. No.: 75,309

[22] Filed: Sep. 13, 1979

[51] Int. Cl.³ .............................................. H02P 13/22
[52] U.S. Cl. ..................................................... 363/25
[58] Field of Search ....................... 363/16, 17, 22–26; 331/DIG. 3; 307/234

[56] References Cited

U.S. PATENT DOCUMENTS

| 3,373,334 | 3/1968 | Geisz et al. | 363/26 |
| 3,609,563 | 9/1971 | Zinn et al. | 307/234 |
| 3,875,527 | 4/1975 | Garcia | 331/DIG. 3 |
| 4,004,187 | 1/1977 | Walker | 363/23 |

FOREIGN PATENT DOCUMENTS 1391902  4/1975  United Kingdom .................... 363/17

OTHER PUBLICATIONS

RCA Publication: "Digital Integrated Circuits", Application Note ICAN-6267, pp. 353 et. seq., Mar. 1971.

Primary Examiner—William H. Beha, Jr.
Attorney, Agent, or Firm—Nathan Edelberg; Jeremiah G. Murray; Bernard Franz

[57] ABSTRACT

This circuit converts a DC voltage of one value to a regulated DC voltage of another value. The circuitry includes a variable frequency clock controlled by an error voltage derived from the converter output. A pulse of constant length is produced for each cycle of the clock. Logic circuitry is arranged to alternately feed these constant length pulses to opposite sides of a push-pull power amplifier, the output of which is rectified and filtered to form the converter output.

2 Claims, 3 Drawing Figures

REGULATED VARIABLE FREQUENCY DC/DC CONVERTER

The invention described herein may be manufactured and used by or for the United States Government for govermental purposes without the payment of any royalties therefor or thereon.

BACKGROUND OF THE INVENTION

Prior art DC/DC converters have included such things as resonating mechanical vibrators for generating an AC wave from a DC input. The AC was then stepped up or down and then rectified to form the DC output voltage. Such mechanical devices have been generally supplanted by solid state circuitry in which the input DC voltage powers a transistor oscillator, the output of which is then stepped up or down and then rectified. Such converters often are combined with some means for voltage regulation. The present invention comprises novel and efficient means and circuitry for DC/DC conversion and voltage regulation utilizing solid state and digital techniques by which the desired functions may be attained efficiently, at low cost, and with compact circuitry.

SUMMARY OF THE INVENTION

This novel circuit comprises a clock frequency generator which is controllable in frequency between certain limits. The clock frequency is automatically controlled by an error voltage which is derived from the converter's output. Each cycle of the variable frequency clock initiates the operation of a one-shot multivibrator with a pulse length of approximately half the shortest period of the clock. The clock frequency is divided by two by means of a flip-flop, the conjugate outputs of which form one input of each two gates. The one-shot multivibrator output forms the second input of each of the aforementioned gates. The gate outputs are connected to the inputs of a push-pull power amplifier. This arrangement results in pulses of fixed length being applied alternately to each push-pull stage, with the pulse frequency being controlled by the error voltage, thus providing the desired voltage regulation. The circuitry of the variable frequency clock and one-shot multivibrator may comprise NOR gates comprising standard integrated circuits.

DETAILED DESCRIPTION OF A PREFERRED EMBODIMENT

Figure 1:
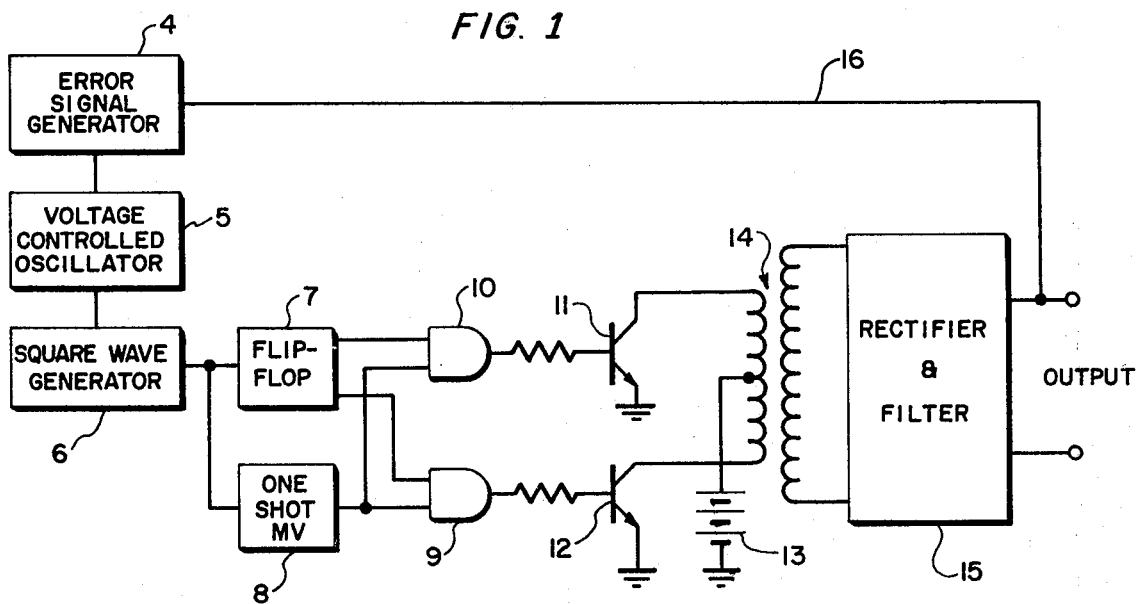
FIG. 1 is a circuit diagram of a preferred embodiment of the invention.

The circuit of FIG. 1 includes error signal generator 4 with its input connected to the converter output via lead 16. The output of error signal generator 4 is connected to the input of voltage-controlled oscillator 5, the output of which is applied to square wave generator 6. The output of square wave generator 6 is applied to the inputs of both the flip-flop 7 and one-shot multivibrator 8. The conjugate outputs of the multivibrator 7 form one of the inputs of each of two AND gates 9 and 10. The output of the one-shot multivibrator 8 forms the second input of both of the aforementioned AND gates 9 and 10. A pair of transistors 11 and 12 are arranged in a push-pull circuit to receive the outputs of the two gates. The gate outputs are applied to the bases of the transistors via a series resistor. The emitters of each of the transistors 11 and 12 are grounded. The input DC voltage 13 is connected to the center tap of the push-pull transformer 14. Opposite ends of this center-tapped winding are connected to the transistor collectors, as shown. The secondary of transformers 14 is applied to rectifier and filter 15, the output of which is the regulated converter output.

The operation of the circuit of FIG. 1 is as follows. Voltage-controlled oscillator 5 includes a tank circuit with a voltage-controllable portion such as a reactance tube or a varactor diode, so that the oscillator frequency can vary in response to variation in the error voltage from generator 4. Error voltage generator 4 contains a means for deriving a variable DC bias which is proportioned to the departure of its input (the converter's output voltage) from the desired converter output voltage. Error signal generator 4 may include a source of reference voltage such as a Zener diode. The output voltage may vary due to changes in output load, or changes in the input voltage represented by battery 13. The sinusoidal output of oscillator 5 is converted into a square wave by means of square wave generator 6, which may comprise merely a diode-type clipper. The output of generator 6 comprises a square wave clock signal of variable frequency. Each cycle of this clock signal initiates a pulse of fixed length at the output of one-shot multivibrator 8. The flip-flop produces a pair of conjugate outputs at one half the variable clock frequency input. The conjugate flip-flop outputs alternately enable AND gates 9 and 10 so that the pulses from one-shot multivibrator 8 are alternately applied to the bases of the transistors 11 and 12. These pulses of constant length and hence energy content are amplified and stepped up or down to the desired output voltage by the push-pull transistor state, and form the converter output after rectification and filtering by element 15. Any departure of the output voltage from the desired value will produce an error signal from generator 4 which will automatically change the frequency of oscillator 5 in such direction as to drive the output voltage to its regulated value. For example, if the output voltage is decreased for any reason, the oscillator frequency would be increased by the resultant error voltage. This would increase the clock frequency and the pulse frequency of the one-shot multivibrator. The resultant increased pulse frequency would drive the output voltage upward until it reached the desired value.

Figure 2:
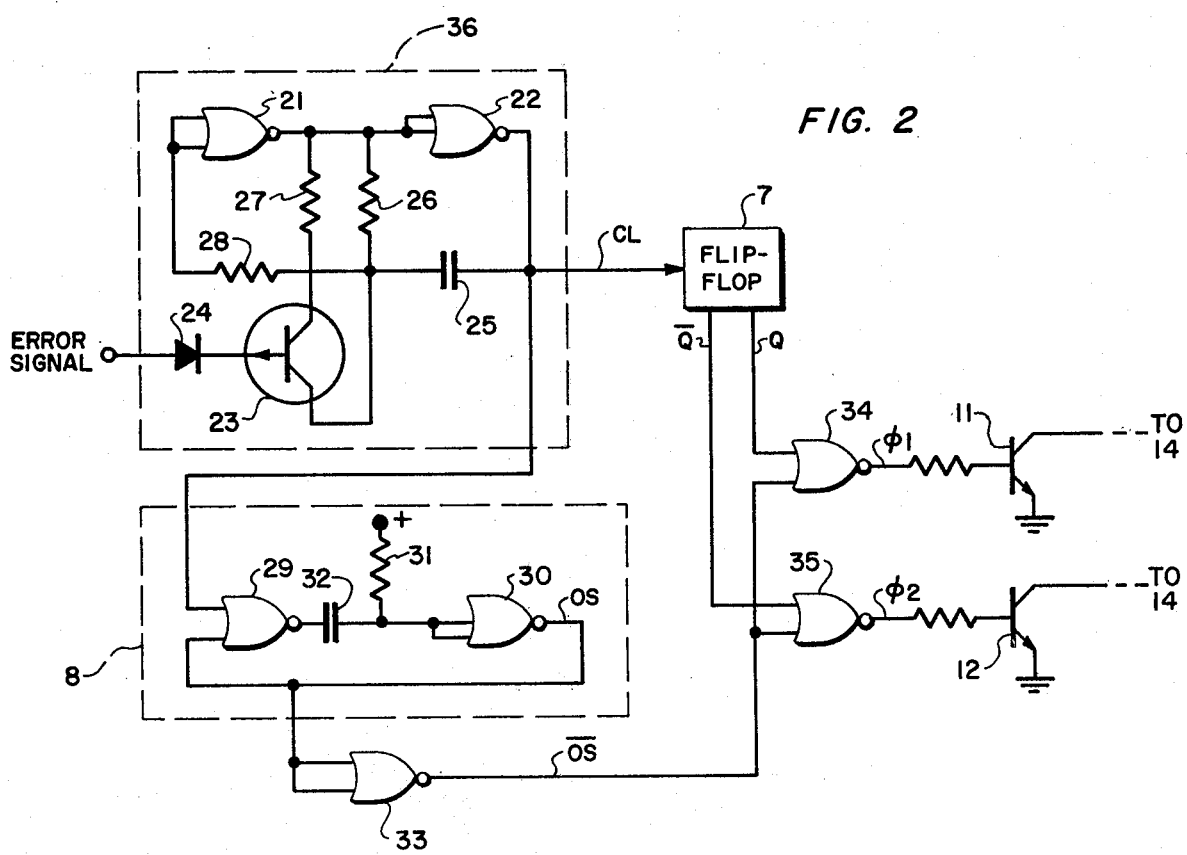
FIG. 2 shows a modified embodiment of FIG. 1, and more particularly shows how the circuit can be built economically using standard integrated circuits.

FIG. 2 shows a modification of the circuit of FIG. 1, in which the novel concept can be economically and compactly implemented by means of standard integrated circuits, mainly NOR gates. In FIG. 2, the elements within the box 36 comprise a variable frequency clock generator which produce a voltage-controllable square wave clock signal similar to that produced by elements 5 and 6 of FIG. 1. Clock generator 36 comprises a pair of NOR gates 21 and 22 connected in cascade, with capacitor 25 and resistor 28 series-connected between the output of gate 22 and the input of gate 21. Field effect transistor 23 is connected from the output of gate 21 via resistor 27 and thence to the junction of capacitor 25 and resistor 28. Resistor 26 connects the junction of the two gates to the junction of the capacitor 25 and resistor 28. The inputs of gates 21 and 22 are tied together, as shown. The error signal for controlling the frequency of the clock generator 36 is applied to the control electrode of field effect transistor 23 via diode 24. The clock generator 36 will produce a square wave at its output, CL, the frequency of which will depend on the value of the capacitor 25 and the three series-connected resistances comprising resistors 26, the field effect transistor 23 and resistor 27. Variation of the error signal voltage varies the effective resistance of field effect transistor 23 which thereby varies the clock frequency in the desired direction. The frequency limits are determined by the value of the resistors 26 and 27. The value of resistor 26 controls the maximum clock frequency and the value of resistor 27 controls the minimum clock frequency.

The circuitry within box 8 of FIG. 2 comprises a one-shot multivibrator comprising a pair of cascaded NOR gates 29 and 30. Capacitor 32 connects the output of gate 29 to the inputs of gate 30. A source of positive potential is connected to the inputs of gate 30 via a resistor 31. One input of gate 29 comprises the output, CL, of clock generator 36. The second input of gate 29 is the output of gate 30, which is also the multivibrator output, OS. The multivibrator 8 produces a pulse of fixed length, OS, the length of which is determined by the values of resistor 31 and capacitor 32, each time the clock generator output goes positive. The output of multivibrator 8 is applied to the inputs of NOR gate 33. Since the inputs of gate 33 are tied together, it functions as an inverter, so that its output $\overline{OS}$ is the inverse of its input signal, OS. The inverted output of the multivibrator 8 forms one input of each of two NOR gates 34 and 35. As in FIG. 1, the flip-flop 7 divides the variable frequency clock signal by two, and the conjugate outputs thereof Q and $\overline{Q}$ form one of the inputs of the two NOR gates 34 and 35. The outputs of gates 34 and 35 are applied to the bases of the transistors 11 and 12, as in FIG. 1. The error signal generator and the remainder of the push-pull stage, including the rectifier and filter 15 would be connected to the circuit of FIG. 2 as shown in FIG. 1.

Figure 3:
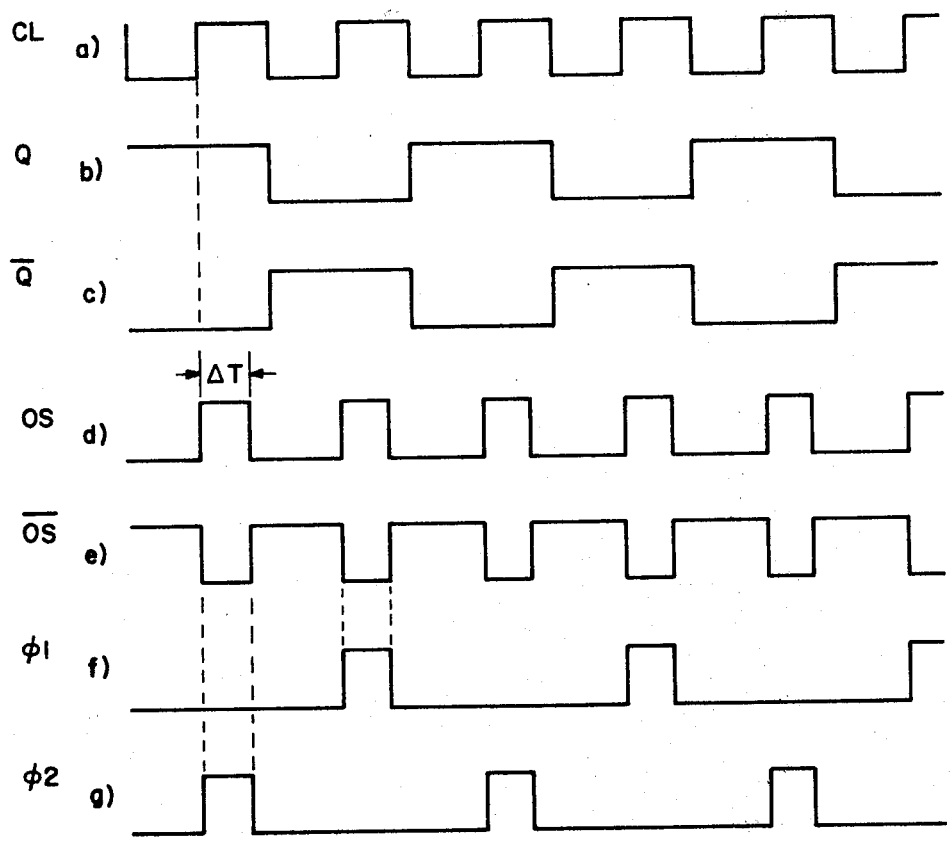
FIG. 3 is a waveform diagram of the circuit of FIG. 2.

FIG. 3 illustrates the mode of operation of the circuit of FIG. 2 by means of waveforms in various parts of the circuit. FIG. 3a shows the square wave output of clock generator 36, CL, for a given error voltage. The conjugate outputs Q and $\overline{Q}$ of flip-flop 7 are shown in FIG. 3b and c. It can be seen that $\overline{Q}$ is the inverse or conjugate of Q and both waves are one half the frequency of the clock frequency. FIG. 3d shows the output of one-shot multivibrator 8, the leading edge of which is seen to coincide with the positive-going portion of clock frequency generator shown in FIG. 3a. The fixed duration of the wave OS, $\Delta T$, is seen to be somewhat less than a half cycle of the clock frequency. FIG. 3e shows the inverted multivibrator output $\overline{OS}$, which is applied as one input of each of the NOR gates 34 and 35. Each NOR gate will have a positive output only when both of their inputs are low or zero. Thus the output of gate 34, $\phi 1$, is positive only when signal Q is low and signal $\overline{OS}$ is low. Also, the output of gate 35, $\phi 2$, is positive only when $\overline{Q}$ and $\overline{OS}$ are both low. It can be seen that the circuitry of FIG. 2 accomplishes the same result as that of FIG. 1 in that alternate pulses in the output of one-shot multivibrator 8 are fed to differenct sides of the push-pull stage.

The pulse length of one-shot multivibrator 8, $\Delta T$, would be selected so that it would comprise approximately one half a cycle of the output of the variable frequency clock generator at its maximum frequency. Thus at any lower frequency the fixed pulse length from multivibrator 8 would be less than one half cycle of the clock, as shown in the waveform of FIG. 3.

The novel circuits shown by utilizing non-dissipative switching techniques to achieve voltage regulation achieve higher efficiency than certain prior art regulation techniques. Further, by utilizing on-off digital circuitry for the voltage conversion, the transistors and transformers are either "on" and operating at maximum efficiency of "off" and dissipating no power. Both of these features thus make for high efficiency.

While the invention has been described in connection with preferred embodiments, obvious variations therein will be apparent to those skilled in the art, thus the scope of the invention should be limited only by the appended claims.

What is claimed is:

1. A regulated DC/DC converter with variable frequency control, comprising:

a push-pull amplifier having a transformer with a centertapped primary winding and two switching transistors connected respectively from opposite ends of the primary winding to a common point, a source of direct-current input voltage connected between the center tap of the primary winding and said common point;

a modulator coupled to control inputs of the transistors to alternately drive them into conduction;

an output circuit comprising a secondary winding of said transformer, a rectifier and a filter to supply a regulated output direct-current voltage;

an error signal generator coupled between said output circuit and said modulator to generate an error signal voltage proportional to the departure of said output voltage from a desired value;

said modulator comprising a clock frequency generator, a one-shot multivibrator to produce a pulse of constant length, a flip-flop, and two coincidence gates;

wherein said clock frequency generator consists essentially of first and second inverting gates, a capacitor and a first resistor connected in series to form a loop, a second resistor connected from the conjunction of the first and second inverting gates to the junction of the first resistor and capacitor, and a field effect transistor in series with a third resistor also connected from the junction of the first and second inverting gates to the junction of the first resistor and capacitor, with the field effect transistor having a gate electrode connected via a diode to the output of the error signal generator, so that the clock frequency generator produces a square wave output signal at a frequency which is continuously variable controlled by said error signal voltage changing the resistance of said field effect transistor, the frequency being within a range determined by said second and third resistors in combination with the first resistor and capacitor;

wherein said one-shot multivibrator comprises a pair of inverting gates in a series loop with a capacitor, and a resistor connected to a direct current bias source, arranged to produce said pulses of constant length;

the output of said clock frequency generator being coupled to inputs of the flip-flop and the one-shot multivibrator to trigger the flip-flop to change state once each clock cycle in response to a transition of the clock cycle in one direction so that the flip-flop is effectively a two-to-one frequency divider, and to trigger the one-shot multivibrator to initiate said pulse of constant length during each cycle in response to the transition in the opposite direction from that which triggers the flip-flop;

the output of the one-shot multivibrator being coupled to apply the same signal to both of said coincidence gates, and the flip-flop having its conjugate outputs connected to different ones of said coincidence gates, said coincidence gates outputs being the outputs of said modulator which alternately apply said pulses of constant length to alternate control inputs of said push-pull amplifier.

2. The converter of claim 1, wherein the coupling from the one-shot multivibrator to the coincidence gates includes a NOR gate used as an inverter, and wherein said first and second inverting gates of the clock frequency generator, said pair of inverting gates of the one-shot multivibrator, and said two coincidence gates, are all similar NOR gates.

* * * * *